United States Patent Office 3,487,007
Patented Dec. 30, 1969

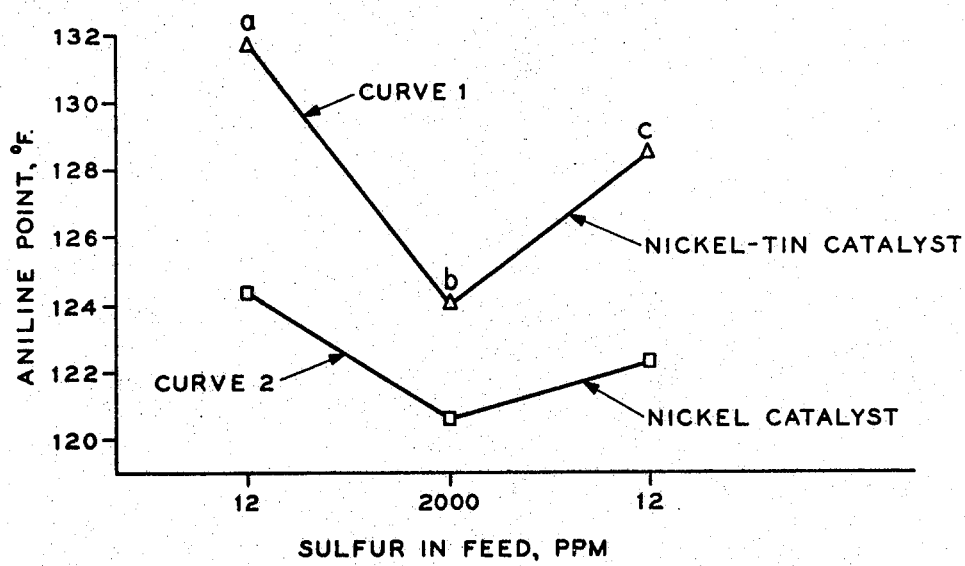

3,487,007
CONTROLLING AROMATIC CONTENT OF THE PRODUCT DURING HYDROCRACKING
Bernard F. Mulaskey, Pinole, Calif., assignor to Chevron Research Company, San Francisco, Calif., a corporation of Delaware
Continuation-in-part of application Ser. No. 645,855, June 8, 1967. This application July 3, 1968, Ser. No. 742,321
Int. Cl. C10g 13/02
U.S. Cl. 208—111                              8 Claims

ABSTRACT OF THE DISCLOSURE

The aromatic content of the product can be controlled and alternately varied during the hydrocracking of the hydrocarbon feed, using a catalyst containing nickel and tin, or compounds thereof, in an amount from 2 to 50 combined weight percent metals, the nickel to tin weight ratio being from 0.25 to 20, associated with a porous inorganic oxide at hydrocracking conditions, including a temperature from 400 to 750° F., by varying the sulfur concentration in the hydrocracking zone. The aromaticity of the product is increased by increasing the sulfur concentration in the reaction zone and is decreased by decreasing the sulfur content.

CROSS-REFERENCE

This application is a continuation-in-part of application Ser. No. 645,855, filed June 8, 1967, now Patent No. 3,399,132, which is in turn a continuation-in-part of application Ser. No. 568,536, filed July 28, 1966, now abandoned.

BACKGROUND OF THE INVENTION

Field

The present invention relates to a hydrocracking process. More particularly, the present invention is concerned with controlling the aromatic content of the product in a hydrocracking process by varying the sulfur concentration in the reaction zone. The catalyst used in the hydrocracking process comprises nickel and tin, or their compounds, associated with a porous inorganic oxide carrier.

Prior art

It is known that platinum group metal-hydrocracking catalysts are sensitive to hydrogen sulfide concentration in the reaction mixture with respect to the product aromaticity. Thus, U.S. Patent 3,132,090 discloses that at certain reaction conditions Group VIII noble metal-containing hydrocracking catalysts are not only sensitive to the presence of hydrogen sulfide in the reaction mixture but also that the sensitivity is reversible. Thus, significant changes in the product aromaticity can be realized by changes in the hydrogen sulfide concentration in the reaction mixture even without a change in the hydrocracking conditions, for example, hydrocracking temperature. For example, increasing the hydrogen sulfide concentration in the reaction zone results in an increase in the aromatic content of the product whereas a decrease in the hydrogen sulfide concentration in the reaction zone results in a decrease in the aromatic content of the product. U.S. Patent 3,132,090 also discloses that catalysts comprising other hydrogenating metal components, such as nickel, are not reversibly sensitive to hydrogen sulfide concentration in the reaction mixture in regards to product aromaticity in the same order of magnitude as platinum catalysts.

There are several advantages realized from having a hydrocracking catalyst and/or hydrocracking process which is sensitive to the presence of sulfur, the sulfur sensitivity permitting alternately increasing or decreasing the aromatic content of the reaction product. Thus, a hydrocracking process designed mainly for the production of gasoline can be easily regulated to produce a high quality jet fuel. In other words, a hydrocracking process can be operated so as to produce high yields of gasoline product when the demand for gasoline on the market is high; the operation may be shifted to produce high yields of jet fuel products as the market requires simply by changing the hydrogen sulfide concentration in the reaction zone.

SUMMARY OF THE INVENTION

It has now been discovered that catalysts comprising nickel, or compounds of nickel, and tin, or compounds of tin, associated with a porous inorganic oxide carrier are also remarkably sensitive to the presence of sulfur in the reaction zone with respect to product aromaticity. Furthermore, the catalysts comprising nickel and tin, or their compounds, are reversibly sensitive to the presence of sulfur in the reaction zone with respect to produce aromaticity; that is to say, an increase in sulfur content of the feed will result in an increase in the aromatic content of the product, whereas a decrease in the sulfur content in the reaction zone will result in a decrease in the aromatic content of the product. Thus, sulfur has been found to affect the hydrogenation activity of the catalyst in a reversible manner.

The present invention is particularly important in view of the low cost of nickel-tin catalysts compared to platinum group metal containing catalysts. Thus, a hydrocracking process can be operated to alternatively produce a gasoline and jet fuel without resorting to the use of an expensive platinum group metal.

The process of the present invention comprises hydrocracking a hydrocarbon feed boiling above the gasoline range containing aromatic hydrocarbons at hydrocracking conditions including a temperature of 400 to 750° F. in the presence of hydrogen with a catalyst comprising a porous inorganic oxide carrier having nickel, or compounds thereof, and tin, or compounds thereof, present in an amount from 2 to 50 combined weight percent metals, and a nickel to tin weight ratio being from 0.25 to 20, to produce a desired product selected from the class consisting of gasoline and jet fuel and controlling and alternately varying the aromaticity of the product by maintaining a relatively high continuous concentration of sulfur above about 10 p.p.m. sulfur to feed in the reaction zone to produce a relatively aromatic product and maintaining a relatively low concentration of sulfur below about 2000 p.p.m. sulfur to feed in the reaction zone to produce a relatively nonaromatic product.

Other modifications of the basic discovery that a nickel-tin containing hydrocracking catalyst is reversibly sensitive in the presence of sulfur with respect to product aromaticity can be made as will be further disclosed and claimed.

BRIEF DESCRIPTION OF THE DRAWING

The present invention can be better understood and will be further explained hereinbefore with reference to the graph in the figure.

The graph in the figure shows for comparison purposes the effect of sulfur addition to the hydrocarbon feed on the aniline point of the product when hydrocracking said feed to lower boiling products at a constant conversion of 60 percent using a catalyst comprising nickel and tin associated with a porous inorganic oxide (curve 1) and a conventional catalyst comprising nickel associated with a porous inorganic oxide (curve 2). The aniline point is a relative measure of the aromaticity of the product, or, in other words, a measure of the hydrogenation activity of the catalyst. A decrease in the aniline point represents an increase in the product aromaticity. The significant reversible selectivity of the catalyst of the present invention, in respect to product aromaticity, is seen in curve 1 in the figure. Increasing the sulfur content of the feed from about 12 p.p.m. to about 2000 p.p.m. resulted in a large increase in the aromatic content of the product. Removing the sulfur from the feed to the previous low level of about 12 p.p.m. reversibly decreased the aromaticity of the product almost to the former low value. Increasing and/or decreasing the sulfur content in the feed in a hydrocracking process using the conventional catalyst containing nickel but no tin did not result in as significant a change in product aromaticity as when using the nickel-tin catalyst.

DESCRIPTION OF THE INVENTION

The catalyst, which finds use in the present invention, comprises nickel and tin, or their compounds, associated with a porous acidic inorganic oxide carrier. The nickel and tin, or their compounds, are preferably present in an amount from 2 to 50 combined weight percent metals. That is, regardless of the form in which nickel and tin exist in the catalyst, whether as metallic nickel and tin, or as nickel and tin compounds, such as the oxides or sulfides, the total combined weight percent of nickel and tin in the catalyst, calculated as the metals, should be from 2 to 50. A catalyst containing less than 2 weight percent total hydrogenating metals is too low in hydrogenating activity to be useful in hydrocracking; rather, hydrocracking with such a catalyst results in the production of excessive coke which results in rapid deactivation of the catalyst. Catalyst compositions comprising total hydrogenating metal contents in excess of 50 weight percent can be prepared and employed for hydrocracking. Generally, however, it is not advantageous to exceed 50 weight percent total hydrogenating metals in the catalyst because of the high cost of the hydrogenating metal components and also because high hydrogenating metal contents severely limit the amount of the carrier. Preferably, catalysts of the present invention comprise nickel and tin, or their compounds, in an amount from 5 to 30 combined weight percent and more preferably from 7 to 25 combined weight percent.

The nickel and tin, or compounds thereof, should be present in the catalyst in a weight ratio of nickel to tin of from 0.25 to 20, determined as the metals. Preferably, the nickel to tin weight ratio is from 0.5 to 20 and most preferably, 0.5 to 10. In general, when employing high combined weights of nickel and tin, it is preferred to use high nickel to tin weight ratios.

The hydrogenating metals, that is, nickel and tin, can be in the metallic form, or in compound form, such as, for example, the oxide or sulfide form. The sulfide form of the metals is the preferred compound form for purposes of the present invention. However, any compounds of the metals which perform as hydrogenating components can be used in the catalyst.

It is not understood why nickel-tin containing catalysts are reversibly sensitive to the presence of sulfur in the feed, in respect to product aromaticity. It is realized that a catalyst comprising nickel in association with a porous inorganic oxide carrier, no tin being present, is only slightly reversibly sensitive to the presence of sulfur in the reaction zone in a hydrocracking process. Furthermore, tin alone is a poor hydrogenating metal component, and thus a catalyst comprising only tin on a porous inorganic oxide carrier is virtually inactive as a hydrocracking metal and finds no commerical hydrocracking value. The combination, however, of nickel and tin, or their compounds, as a hydrocracking catalyst results in a superior hydrocracking catalyst and a hydrocracking catalyst that is reversibly sensitive, with respect to product aromaticity, to changes in sulfur concentration in the reaction zone.

The carrier or support which is used for purposes of the present invention comprises a porous inorganic oxide. By "porous" inorganic oxide is meant the inorganic oxides which have a high surface area, i.e., greater than 50 m.$^2$/gm., and preferably greater than 150 m.$^2$/gm. Generally, the porous inorganic oxides which are useful as catalyst supports for the present invention have surface areas from about 50 to 700 m.$^2$/gm. Suitable inorganic oxides which can be used in accordance with the present invention includes the oxides of the metals and nonmetals of Groups II through VI of the Periodic Table. Natural or synthetically-produced inorganic oxides, or combinations thereof, can be used. Thus, for example, suitable inorganic oxides include silica, alumina, magnesia, titania, zirconia and combinations thereof. Generally, it is preferable to employ at least one porous inorganic oxide which is acidic in nature. Typical porous acidic inorganic oxides are the acid-treated clays and silica-containing mixed oxides. For example, it is generally preferable that the carrier comprises a siliceous oxide. Thus, suitable catalysts comprising siliceous oxides include, by way of example, silica-alumina, silica-magnesia, silica-zirconia, silica-magnesia-titania, and silica-alumina-zirconia. Particularly preferred catalysts are the silica-aluminas, particularly silica-aluminas having silica contents in the range of 30 to 99 weight percent.

Other suitable carrier materials for the purposes of the present invention include the crystalline zeolitic aluminosilicates. Both the natural and synthetic crystalline zeolitic aluminosilicates can be used. Crystalline zeolitic aluminosilicates, often referred to as zeolites, comprise aluminosilicate cage structures in which alumina and silica tetrahedra are intimately connected with each other in an open three-dimensional network. The tetrahedra are cross-linked by the sharing of oxygen atoms. In general, the spaces between the tetrahedra are occupied by water molecules prior to dehydration. Dehydration results in crystals interlaced with channels or pores of molecular dimensions, which channels or pores selectively limit the size and shape of foreign substances that can be adsorbed. Thus, the crystalline zeolitic aluminosilicates are often referred to as molecular sieves. In general, the crystalline zeolitic aluminosilicates have exchangeable zeolitic cations associated with the silica-alumina tetrahedra which balances the negative electrovalence of the tetrahedra. The cations may be any number of ions such as, for example, the alkali metal ions, the alkaline earth ions, and the rare earth ions. The cations may be mono-, di-, and trivalent. In general the preferred forms are those wherein the exchangeable zeolitic cations are divalent metals, and/or hydrogen. Normally the zeolites are prepared first in the sodium or potassium form, after which the monovalent cations are ion-exchanged out with desired divalent metal cations, such as calcium, magnesium or manganese cations, or where the hydrogen form is desired, with ammonium cations followed by heating to decompose the ammonium cations to leave hydrogen ions. The hydrogen form is often referred to as decationized.

The crystalline zeolitic aluminosilicates possess relatively well-defined pore structures. For purposes of the present invention, it is preferred that the pore structure of the crystalline zeolitic aluminosilicates comprise openings characterized by pore diameters greater than about 6 A. and particularly uniform pore diameters of approximately 6–15 A. The uniform pore structure wherein the pores are greater than 6 A. permit hydrocarbon access to the catalyst. Generally, zeolites which find use for purposes of the present invention have silica/alumina ratios in the crystalline form greater than about 2. Examples of appropriate crystalline zeolitic aluminosilicates are the natural faujasites, synthesized zeolite X disclosed in U.S. Patent 2,882,244, zeolite Y disclosed in U.S. Patent 3,130,007, zeolite L disclosed in U.S. Patent 3,216,789, and decationized zeolite Y described in U.S. Patent 3,130,006.

The nickel-tin catalytic composition used in the present invention can be prepared by any of the conventional methods for associating catalytically active amounts of hydrogenating metal components with a carrier. Thus, the nickel and tin components may be associated with a porous inorganic oxide by impregnation or by ion-exchange. Impregnation is generally accomplished using an aqueous solution of a suitable nickel compound and/or tin compound. Either simultaneous or sequential impregnation of the metal components is suitable. Ion-exchange is generally accomplished by using an aqueous solution of a suitable metal salt wherein the nickel and/or tin is present in the cationic state. As examples, in the preparation of a catalyst wherein the carrier is an amorphous silica-alumina, the nickel and tin are normally associated with the silica-alumina by impregnation. On the other hand, when preparing a catalyst wherein the porous inorganic oxide is a crystalline zeolitic aluminosilicate, the nickel and tin can be associated with the zeolite either by impregnation or ion-exchange. Typical nickel and tin compounds which can be used for impregnation or ion-exchange are the chlorides, nitrates, sulfates, acetates and amine complexes. The tin can be in the stannous or stannic oxidation state.

The catalyst used in the present invention can be prepared by coprecipitating or cogelling a mixture of compounds of the hydrogenating metals and compounds of the metals and/or nonmetals whose oxides form the inorganic oxide carrier. Both hydrogenating metals can be coprecipitated or cogelled with the compounds of the metals and/or nonmetals whose oxides form the inorganic oxide carrier; or, one of the hydrogenating metals can be associated with the inorganic oxide carrier by coprecipitation or cogelation, and the other hydrogenating metal then intimately associated with the coprecipitated composite by impregnation or other suitable means. For example, a coprecipitated composite of tin, or compound thereof, and silica-alumina can be prepared by coprecipitating a mixture of stannous chloride, aluminum chloride, and sodium silicate. Nickel, e.g., as nickel chloride, can then be intimately associated with the coprecipitated composite by impregnation.

A preferred method of preparation of the novel catalytic composition used in the process of the present invention is by simultaneous coprecipitation or cogelation of a mixture of nickel and tin compounds, and compounds of the metals and/or nonmetals whose oxides form the inorganic oxide carrier. The method of preparation of a coprecipitated composite of only one of the hydrogenating metals and an inorganic oxide is, in general, the same as that for a coprecipitated composite of both metals and an inorganic oxide. For the sake of brevity, the preparation of a coprecipitated composite will be described only in terms of using both hydrogenating metals in the coprecipitated composite. In general, preparation of the coprecipitated composite can be accomplished by forming a solution and/or a sol of the compounds, subsequently precipitating the mixture, preferably at a pH from about 5.5 to 8, by the addition of a precipitating agent, as for example a base, and then washing the coprecipitated composite to remove extraneous materials. Finally, the coprecipitated composite can be dried and then calcined at an elevated temperature. Thus, for example, a coprecipitated composite comprising nickel and tin intimately associated with silica-alumina can be prepared by forming an aqueous solution of alumina chloride, sodium silicate, nickel chloride and stannous chloride. The solution can then be coprecipitated by the addition of ammonium hydroxide; thereafter the coprecipitated composite can be washed, dried and calcined.

In order to prepare a coprecipitated composite comprising the porous inorganic oxides and nickel and tin components, it is desirable that the starting components be such that when admixed together the resulting mixture will form a solution and/or sol so as to obtain uniform dispersion throughout the mixture.

The compounds in the initial mixture can advantageously be salts such as the nitrates, citrates, formates, alkoxides, and sulfates. Preferably chloride and acetates are employed. In view of the process advantages of using chloride salts due to their readiness to form solutions with other compounds, their commercial availability and relatively low price, it is often desirable to employ them. The anion content, e.g., chloride, in the final coprecipitate is preferably reduced to below about 0.25 percent of the total weight of the final coprecipitate. Washing with water can often effectively lower the anion content to the desirable limit. If anions are present in the coprecipitate which are difficult to remove by washing, such anions can be ion-exchanged with anions more easily removed by washing. Preferred anions for use in ion-exchange are the bicarbonates, carbonates, acetates, and formates.

As indicated above, it is generally advantageous to have silica present as part of the carrier. Thus, in preparing a coprecipitated composite of catalytically active amounts of nickel and tin, or their compounds, and a porous inorganic oxide, it is desirable that a form of silica be present in the mixture of metal and/or nonmetal compounds prior to coprecipitation. It is often desirable to employ silica sols when silica is to be a component of the coprecipitate. In such a case, the silica sol can be made by any conventional procedure. Thus, silica sols can be made by hydrolizing tetraethyl orthosilicate with an aqueous HCl solution. Likewise, silica sols can be prepared by contacting silicon tetrachloride with a cold methanol and water solution or with 95 percent ethyl alcohol, or with cold water or ice. Also silica sols can be made by contacting sodium silicate with an ion-exchange resin to remove the sodium, or by contact with an acid at a pH of about 2.5 or less.

After formation of the initial mixture, it is coprecipitated by conventional techniques. Precipitation is preferably conducted at a pH between about 5.5 and about 8. Thus, the initial mixture, if acidic, can be precipitated by the addition of a base. If the mixture is basic, it can be precipitated with an acid. The precipitation can be stepwise, as by a form of titration, or simultaneous, as by mixing of acidic or basic solutions as the case may be in the proper ratios. It is preferable that the precipitating agent should not introduce any components in the mixture that are deleterious.

Following precipitation of the mixture of compounds, the excess liquid is usually removed by filtration. Thereafter the precipitate is washed and ion-exchanged to remove impurities. Washing is generally conducted in more than one step, using water or dilute aqueous solutions of ammonium salts, e.g., ammonium acetate. The coprecipitated composite is then dried in air or inert gases at a temperature less than 400° F., preferably from about 150°–300° F. The coprecipitate is then calcined, generally at a temperature of from about 750 to 1400° F. in the presence of an oxygen-containing gas.

As part of the present invention, the catalyst employed can comprise a crystalline zeolitic aluminosilicate thoroughly admixed with an amorphous porous inorganic oxide, preferably an amorphous siliceous oxide, e.g., silica-alumina, the mixture containing nickel and tin, or their compounds. The hydrogenating metals, i.e. nickel and tin, can be associated with the crystalline zeolitic aluminosilicate or with the amorphous porous inorganic oxide or with both. Also, one of the metals, e.g., nickel, can be associated with the crystalline zeolitic aluminosilicate and the other metal, e.g., tin, can be associated with the amorphous porous inorganic oxide. The crystalline zeolitic aluminosilicate can be admixed with the amorphous porous inorganic oxide simply by physically mixing the two components either in the dry state or in the presence of water. In the preparation of a catalytic composition of matter comprising a crystalline zeolitic aluminosilicate thoroughly admixed with an amorphous porous inorganic oxide, and containing nickel and tin, or their compounds, the crystalline zeolitic aluminosilicate can be added at any suitable stage of the catalyst preparation. In general, it is preferred that the crystalline zeolitic aluminosilicate be intimately dispersed throughout the amorphous porous inorganic oxide. Preferably, the crystalline zeolitic aluminosilicate is associated with the amorphous component by addition of the crystalline zeolitic aluminosilicate to a mixture, e.g., solution and/or sol, of nickel and tin compounds, and compounds of the metals and/or nonmetals whose oxides form the amorphous porous inorganic oxide during the precipitation of the mixture. It is important that the mixture not be of sufficient acidity to destroy the crystallinity of the zeolite. The zeolite preferably should be present in the final catalytic composition in an amount from 5 to 80 weight percent and more preferably in an amount from 5 to 50 weight percent and most preferably in an amount from 10 to 35 weight percent.

The catalyst useful for purposes of the present invention can be promoted for hydrocracking activity by the addition of halides. Preferably fluoride is employed. The total halide content is preferably associated with the catalyst in an amount from 0.1 to 5 weight percent. Fluoride can be incorporated onto the catalyst at any suitable stage of catalyst manufacture, as, for example, prior to or following incorporation of nickel and tin, or compounds thereof, with the carrier. In general, the fluoride is combined with the catalyst by contacting suitable compounds such as ammonium fluoride or hydrogen fluoride, either in a water-soluble or in gaseous form, with the catalyst. Also the catalyst can be fluorided by treating the finished catalyst with an organic fluoride-containing compound, such as fluorobenzene. Preferably the fluoride is incorporated onto the catalyst from an aqueous solution containing the fluoride. In the preparation of a coprecipitated composite, the fluoride can be added during the precipitation.

The form in which the catalyst is used will depend on the type of process involved in the hydrocracking operation, that is, whether the process involves a fixed bed, moving bed, or a fluid operation. Generally, the catalyst will exist in the form of beads, tablets, pellets, spheroidal particles or extruded particles for use in fixed bed or moving bed operations; whereas in a fluidized bed operation, the catalyst will generally exist in a finely-divided or powder form. The catalytic composition can be mixed with a support or binder, if desired, to provide beneficial properties such as increased compactibility or attrition resistance. The particular chemical composition of the support or binder is not critical. It is, however, necessary that the support or binder employed be thermally stable under the conditions at which the hydrocarbon hydrocracking process is carried out.

For purposes of the present invention, the sulfur level in the hydrocracking reaction zone is preferably regulated in the range from about 10 p.p.m. sulfur to as high as 2000 p.p.m. sulfur by weight, but more preferably it is regulated in the range from 10 to 200 p.p.m. sulfur. Higher levels of sulfur could be used, for example, up to about 4000 p.p.m. Sulfur concentrations above about 4000 p.p.m. are not desirable because of the large volumes of sulfur which must be handled and because the catalyst sensitivity is not particularly appreciable at the very high levels of sulfur. At the very low sulfur levels, i.e., below 10 p.p.m. sulfur, the reversible selectivity is not appreciable. Thus, the range is preferably from 10 to 2000 p.p.m. sulfur to feed in the reaction zone and more preferably, from 10 to 200 p.p.m.

The sulfur used to control the product aromaticity may be of any of a variety of sulfur-containing compounds. Thus, for example, organic sulfur compounds in the feed can be used. Likewise, dimethyldisulfide or hydrogen sulfide, etc. may be added to the feedstock prior to introduction of the feed to the reaction zone or may be added to the feed in the reaction zone. Hydrogen sulfide is a preferred form of sulfur. It is understood that the preferred range of sulfur, i.e., from 10 to 2000 p.p.m., is based on the sulfur, regardless of the form in which sulfur is present. The sulfur concentration can be maintained by blending the feed with a sulfur-containing compound prior to introduction of the feed to the reaction zone, or by varying the proportion of sulfur-containing compounds in the recycle gas which enters the reaction zone, or by simply adding sulfur to the reaction zone or any equivalent method.

It is found necessary for the present invention that the hydrocarbon feedstock which is subjected to hydrocracking processes wherein the aromaticity of the product is selectively varied or controlled by sulfur addition to be substantially aromatic in character, i.e., at least about 10 percent by volume of the feed should exist as aromatics and preferably 20 volume percent. The conditions of temperature and pressure involved in the hydrocracking operation are generally not susceptible to the synthesis of aromatics from nonaromatics. Thus, the reversible selectivity advantage of the catalyst in respect to product aromatically is conditioned on the ability of the catalyst to hydrogenate aromatics already present in the feed, and not upon the ability of the catalyst to produce aromatics from nonaromatic compounds.

In general the feedstock, besides containing at least 10 volume percent aromatics, should boil within the range from about 300 to 1100° F. and preferably from about 400 to 1000° F. Particular feedstocks which may be used include heavy virgin crudes, vacuum distillation residues, catalytic cycle oils, gas oils resulting from the visbreaking of heavy oils, solvent deasphalted oils, and hydrocarbon distillates. Such hydrocarbon fractions can be derived from petroleum crude oils, gilsonite, shale oils, tar sand oils, coal hydrogenation and carbonization products and the like.

In general it is preferred that the feedstock be limited in nitrogen content. Thus, it is preferred that the feed contain less than about 200 p.p.m. nitrogen based on the hydrocarbon feedstock and preferably less than 25 p.p.m. nitrogen. The presence of nitrogen compounds hinders a flexible operation since relatively high hydrocracking temperatures are required in order to overcome the poisonous effects of the nitrogen compounds. When high concentrations of nitrogen are present, i.e., greater than 200 p.p.m., the hydrocracking temperatures are generally without the range which is preferably used to obtain the reversible sensitivity of the catalyst, i.e., from 400–750° F.

The nitrogen may be removed in a hydrofining or denitrification zone. Thus, the hydrofining operations are generally conducted at a temperature from 500 to 850° F. and preferably from 700 to 850° F., and a pressure in the range of 400 to 4000 p.s.i.g., a liquid hourly space velocity, i.e., the flow of hydrocarbon feed relative to the catalyst, of from 0.2 to 10, and a hydrogen flow rate of above about 500 s.c.f./bbl. of feed. Organic nitrogen compounds in the feed are converted to ammonia which can be removed relatively easily prior to hydrocracking. However, when zeolitic catalysts are used, the hydrofined feed may be passed directly to the hydrocracking reaction zone containing the zeolite-containing catalyst without intermediate removal of the ammonia.

The hydrocracking conditions of temperature and pressure, hydrogen flow rate and liquid hourly space velocity in the reactor can be correlated and adjusted depending on the particular feedstock used and the particular product desired in the process of the present invention. The temperature of the hydrocracking is accomplished in the range of 400 to 750° F. and preferably from 400 to 700° F. Generally, temperatures above 750° F. are not desired inasmuch as the reversible sensitivity of the process is not significant at the higher temperatures, i.e., above 750° F. At the higher temperatures, the product is always substantially aromatic in character regardless of whether sulfur is present or not. At temperatures below about 400° F., insignificant hydrocracking occurs.

The pressure in the hydrocracking reaction zone for purposes of the present invention will generally be between about 500 to 6000 p.s.i.g., and preferably from 500 to 2500 p.s.i.g. The higher pressures are generally used with the higher boiling feedstocks or when less aromatics are desired in the products. The hydrogen flow rate into the reactor is maintained generally between 1,000 to 20,000 s.c.f./bbl. of feed and preferably in the range 4,000 to 10,000 s.c.f./bbl. The hydrogen consumption will vary depending on the properties of the feed and the hydrocracking conditions used, but there is generally consumed in the hydrocracking zone at least 500 s.c.f./bbl. of hydrogen per barrel of feed. In general, the hydrogen consumption will generally range from 500 to 5,000 s.c.f./bbl. The excess hydrogen not consumed in the reaction is separated from the treated feed and preferably purified and recycled. The liquid hourly space velocity (LHSV) will generally be in the range from 0.1 to 10 and preferably from 0.3 to 5.

The reversible selectivity for product aromaticity of the nickel-tin catalytic composition offers many possible uses for the catalyst and the process. Thus, in accordance with the present invention, the sensitivity of the catalyst to sulfur can be used to alternately produce a gasoline product when the sulfur content is increased and a high quality jet fuel when the sulfur content is decreased. In general, a gasoline fraction boils between the range of about 180 to 400° F. and preferably 180 to 350° F. A jet fuel fraction boils within the range of about 300 to 530° F. and preferably from 320 to 500° F. Jet fuel fractions are generally paraffinic in nature. Thus, increasing the sulfur content in a hydrocracking process conducted in accordance with the present invention will increase the amount of aromatics in the feed to product a gasoline product; decreasing the sulfur in the reaction zone in accordance with the present invention will decrease the aromatics in the product and increase the yield of jet fuel fraction.

There are also many other advantages which can be obtained by using the nickel-tin catalytic composition in a hydrocracking process. For example, in a hydrocracking process, it may be desirable to maintain a product of constant aromaticity throughout the duration of the operation. However, in general, the product obtained in a hydrocracking process wherein a conventional catalyst is used, e.g., a hydrogenating nickel component associated with silica-alumina, will increase in aromaticity with length of catalyst life, generally as a result of the increase in temperature necessary to maintain desirable conversion levels. Inasmuch as the novel catalytic composition of the present invention is reversibly sensitive to sulfur in respect to product aromaticity, that is, for example, the aromaticity of the product decreases with decrease in sulfur content in the feed, the catalyst can be used in a hydrocracking process to produce a product of relative constant aromatic content. Thus, in a hydrocracking process wherein a hydrocarbon feed containing aromatics and sulfur is contacted at hydrocracking conditions in the presence of hydrogen with a catalyst comprising catalytically active amounts of nickel and tin, or compounds thereof, associated with a porous inorganic oxide, to produce a lower boiling product and the product aromaticity increases with length of catalyst use as a result of loss of hydrogenation activity, the product can be maintained at a relative constant aromatic content by reducing the sulfur content in the feed from its originally high value, e.g., greater than 200 p.p.m., at a rate to compensate for the increase in aromatics due to length of catalyst use.

As a further advantageous feature of the present invention, a hydrocracking process to produce lower boiling products can be conducted under conditions wherein hydrogen consumption is maintained relatively constant throughout the process. Generally, the hydrogen consumption will decrease with length of catalyst service when conventional hydrocracking catalysts are used. Thus, as a feature of the present invention, in a hydrocracking process wherein a hydrocarbon feed containing aromatic hydrocarbons and sulfur is contacted in the presence of hydrogen at hydrocracking conditions with a catalyst comprising catalytically active amounts of nickel and tin, or compounds thereof, associated with a porous inorganic oxide to produce a lower boiling product, the hydrogen consumption during the process can be maintained relatively constant by alternatively increasing or decreasing the sulfur content of said feed at a rate to compensate for any change in hydrogen consumption associated with length of service of said catalyst.

Moreover, the present invention finds use in a two-stage hydrofining-hydrocracking process. In the hydrofining process, wherein a hydrocarbon feed containing aromatics and sulfur is contacted with a conventional hydrofining catalyst in the presence of hydrogen at hydrofining conditions to decompose and remove organic sulfur and nitrogen, the effluent produced generally increases in aromatics with deactivation of the hydrofining catalyst. An increase in aromatics in said effluent, which effluent is subsequently contacted with the hydrocracking catalyst, results in an increase in the fouling rate or deactivation of the hydrocracking catalyst. However, when using the catalyst of the present invention, which comprises catalytically active amounts of nickel and tin, or compounds thereof, associated with a porous inorganic oxide, the hydrogenation activity can be increased by a decrease in the sulfur content in the effluent. The increase in hydrogenation activity counteracts the deactivating effect of increased aromatics in the effluent. Thus, the overall length of life of the hydrocracking catalyst can be significantly increased by monitoring the deactivation of said hydrocracking catalyst due to the presence of aromatics, as, for example, by measuring the temperature necessary to produce a certain conversion level, and decreasing the sulfur content in the effluent from the hydrofining zone by adjusting the hydrofining conditions at a rate sufficient to compensate for said deactivation due to aromatics.

References will be made hereinafter in detail to catalyst activity which refers to the ability of a catalyst to promote hydrocracking reactions. The activity of any particular catalyst can be best be known by a standard test from which the "activity index" of the catalyst can be determined. A definition and description of "activity index" is found in U.S. Patent 3,243,368. The activity index can be used to effectively compare various catalysts. However, it must be emphasized that the differences in activity indices between catalyst are highly significant and not linear in function. Thus, for example, a two-fold increase in the activity index might actually result in a three-fold increase in conversion to lower boiling products. Hence, what may appear to be a nominal increase in the activity index can be, in fact, one of considerable importance, the difference being not merely one of degree but of kind.

In testing a catalyst to determine its activity index, a hydrocarbon feedstock, along with 12,000 s.c.f. hydrogen per barrel of feed, is passed is contact with the catalyst in a reactor at a liquid hourly space velocity of 2 and at a reactor temperature of 570° F. The reactor temperature is then reduced to 540° F. and the feed passed through for another period of time at the same rate. Samples of the product are collected at about 2 hour intervals during the latter period of time. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value can be obtained. Samples collected at the end of the eighth hour of operation at the 540° F. temperature are usually regarded as representative of steady state operating conditions and may be distilled to determine conversion to products boiling below the initial boiling point of the feed. This conversion under steady state test conditions is a true measure of the activity of the catalyst. The difference between the API gravity of the product samples and the API gravity of the feed is a rapid and convenient method of characterizing the catalyst which correlates smoothly with conversion. For convenience, the foregoing change in API gravity of the product from that of the feed is referred to as the activity index of the catalyst.

In measuring the activity indices of particular catalysts for purposes of the present invention a straight-run feedstock, identified as feed 1 in Table I, was passed in contact with the catalyst at 570° F. for 34 hours, whereupon the reactor temperature was lowered to 540° F. and the feed passed through for another 34 hours. Thereafter, the feedstock was changed to a light catalytic cycle oil identified either as feed 2 or feed 3 in Table I and passed in contact with the catalyst at 540° F. for 30 hours. During this latter 30 hours, the API gravity of the product was measured every 2 hours, and the activity index determined. In a few instances, the straight-run feedstock (feed 1) was passed in contact with the catalyst for the latter 30 hours and the API gravity of the product used to determine the activity index.

TABLE I

|  | Feed 1 | Feed 2 | Feed 3 |
|---|---|---|---|
| Gravity, ° API | 31.5 | 28.5 | 29.3 |
| Aniline Point, ° F | 172.6 | 111.6 | 119.4 |
| Nitrogen, p.p.m | 0.44 | 0.55 | 0.14 |
| Aromatics, vol. percent | 10.8 | 35.1 | 29.4 |
| Naphthenes, vol. percent | 72.2 | 51.6 | 59.6 |
| Paraffins, vol. percent | 17.1 | 13.4 | 11.0 |
| Feed Distillation Range, ° F.: |  |  |  |
| Start | 391 | 415 | 406 |
| 5% | 493 | 449 | 438 |
| 10% | 534 | 462 | 453 |
| 30% | 602 | 482 | 480 |
| 50% | 643 | 510 | 511 |
| 70% | 676 | 548 | 557 |
| 90% | 720 | 608 | 624 |
| 95% | 736 | 629 | 658 |
| End Point | 809 | 727 | 719 |

The following examples will more clearly set forth various features of the present invention.

EXAMPLE 1

A coprecipitated composite comprising at least one hydrogenating metal component, i.e., nickel or tin, or compounds thereof, and silica-alumina can preferably be prepared by precipitating an aqueous solution of glacial acetic acid, a compound of the hydrogenating metal or metals, e.g., nickel chloride or stannous chloride, a compound of aluminum, e.g. aluminum chloride, and a compound of silicon, e.g. sodium silicate, with ammonium hydroxide. The resulting slurry can be filtered, washed, dried and thereafter calcined. If desired the coprecipitated composite can be sulfided.

A catalyst comprising nickel and tin oxides associated with a porous inorganic oxide was prepared by a preferred coprecipitation procedure of the present invention. A solution was prepared by adding 39 grams of $SnCl_2 \cdot 2H_2O$, 1464 grams of an $AlCl_3$ solution containing 117 grams/liter of aluminum, and 335 grams of an $NiCl_2$ solution containing 181 grams/liter of nickel directly to a vessel containing 4 liters of water and 180 ml. of glacial acetic acid. Thereafter 878 grams of commercial sodium silicate (29.6% $SiO_2$ and 9.2% $Na_2O$) dissolved in 3 liters of water were added and the resulting mixture rapidly stirred to form a clear solution and/or sol. The components were then coprecipitated to a final pH of about 7.5 by slowly adding, accompanied by stirring, a solution composed of 750 ml. of 15 M $NH_4OH$ in 2 liters of water. The resulting slurry was then aged for ½ hour at a temperature of 149° F., the pH of the slurry being about 6.5 to 7.5 during the aging period. The slurry was then cooled and filtered to remove excess water and the precipitate recovered. The latter was then sequentially washed four times with a 1 percent aqueous solution of ammonium acetate followed by one wash with distilled water. All washes were conducted at a temperature of about 150° F. and a pH of about 6.5. The precipitate from the last wash was dried for 15 hours at 150° F. and thereafter calcined by contacting with air at a temperature ranging from 400 to 1000° F. for 6 hours, then contacted with dry air at a temperature of 1350° F. for 3 hours. The resulting composite of metal oxides contained 11.2 weight percent nickel oxide and 4.9 weight percent tin oxide, and 83.9 weight percent silica-alumina, the silica to alumina weight ratio being 1.9.

The coprecipitated composite of metal oxides was subsequently sulfided by insertion into a reactor where it was heated at 520° F. and a pressure of about 1200 p.s.i.g. in flowing hydrogen for a period of about 1 hour. The catalyst was substantially sulfided by passing a mixture of dimethyldisulfide and mixed hexanes (the mixture contained 7.3 volume percent dimethyldisulfide) into the flowing hydrogen. Injection of the sulfiding agent was continued for 1 hour at a temperature of about 540° F. and then discontinued.

The sulfided catalyst was tested for hydrocracking and found to have increased cracking activity and hydrogenation activity as compared to a catalyst comprising nickel without tin.

EXAMPLE 2

A series of catalysts comprising various concentrations of nickel and tin associated with porous silica-alumina were prepared and sulfided by the method set forth in Example 1. For comparison purposes, catalysts comprising only nickel associated with porous silica-alumina were prepared and sulfided generally as described in Example 1. Furthermore, catalysts comprising various other combinations of hydrogenating metal components were prepared by coprecipitation for comparison purposes. The catalysts were tested for hydrocracking under conditions to permit the determination of the activity indices of the catalysts. The activity indices of the catalysts as well as the amount of hydrogenating metal component in the catalysts are tabulated in Table II. The weight percent hydrogenating metal component is based on the total catalyst composition. The silica to alumina weight ratio in all instances was 1.9 Also shown are the feeds (from Table I) which were used to determine the activity indices.

TABLE II

| Catalyst | Weight Percent | | | Feed | Activity Index |
|---|---|---|---|---|---|
|  | Ni | Sn | Metal |  |  |
| A | 8.8 | 0 |  | 2 | 14.1 |
| B | 8.8 | 4.3 |  | 2 | 29.0 |
| C | 8.1 | 4.5 |  | 2 | 24.3 |
| D | 8.5 | 8.2 |  | 2 | 25.0 |
| E | 8.2 | 2.15 |  | 2 | 20.0 |
| F | 10.0 | 17.6 |  | 1 | 17.5 |
| G | 7.9 | 6.0 |  | 1 | 27.0 |
| H | 10.0 | 1.1 |  | 2 | 23.3 |
| I | 2.5 | 0 |  | 2 | 8.6 |
| J | 2.5 | 1.0 |  | 2 | 11.8 |
| K |  |  | 8.8  10 (Co) | 2 | Nil |
| L | ~8.8 |  | 4 (Zn) | 2 | 12.8 |
| M | ~8.8 |  | 4.7 (Pb) | 2 | 5.2 |
| N | 0 | 9.0 |  | 2 | Nil |

Catalyst A which comprises 8.8 weight percent nickel associated with silica-alumina but contains no tin has an activity index of 14.1. The addition of small amounts of tin to a catalyst significantly increases the activity index. For example, catalyst B comprising 4.3 weight percent tin and 8.8 weight percent nickel has an activity index of 29. Even the presence of 1 weight percent in a catalyst comprising nickel leads to increased activity over a catalyst having no tin. Compare, for example, the activity indices of catalysts I and J. The catalyst comprising tin as the hydrogenating metal component associated with silica-alumina, that is catalyst N, has virtually a zero activity index. The catalysts containing cobalt and tin (catalyst K); nickel and zinc (catalyst L); and nickel and lead (catalyst M) possess very low activity indices. This strikingly illustrates the uniqueness of the combination of nickel and tin with a porous inorganic oxide support.

EXAMPLE 3

Catalysts were prepared whereby the hydrogenating nickel and tin components were impregnated onto a porous inorganic oxide. Thus, for example, a catalyst comprising 8 weight percent nickel and 4 weight percent tin, based on the final catalyst composition, was prepared by impregnating a silica-alumina carrier with a nickel chloride and tin chloride solution. Thereafter, the impregnated catalyst was dried, then steam calcined at 800° F. to remove extraneous materials, e.g., chloride, and thereafter calcined in a dry atmosphere. The catalyst was subjected to sulfiding and subsequently tested for hydrocracking activity. Another impregnated catalyst was prepared by impregnating a crystalline zeolitic aluminosilicate (zeolite Y) with a nickel chloride and tin chloride solution. The impregnated zeolite catalyst was dried, calcined and sulfided by conventional processes, and then tested for hydrocracking.

The above impregnated catalysts were found effective for hydrocracking, although they did not perform as well for hydrocracking as the coprecipitated catalyst of Example 1.

EXAMPLE 4

A series of catalysts were prepared comprising various concentrations of a crystalline zeolitic aluminosilicate (zeolite Y) thoroughly admixed with amorphous silica-alumina, the composition containing various concentrations of nickel and tin. The catalysts were prepared and sulfided by the procedure generally set forth in Example 1. In the preparation of the catalysts, the zeolite was added to the solution and/or sol of compounds during precipitation. The catalysts were tested for hydrocracking under conditions to permit the determination of the activity indices of the catalysts. The results are tabulated in Table III.

TABLE III

| Catalyst | Weight Percent | | | Feed | Activity Index |
|---|---|---|---|---|---|
| | Ni | Sn | Zeolite | | |
| O | 9.2 | 4.0 | 15 | 3 | 32.2 |
| P | 7.6 | 2.9 | 30 | 3 | 27.0 |
| Q | 9.8 | 8.6 | 30 | 3 | 19.5 |

EXAMPLE 5

A catalyst comprising 11.1 weight percent nickel, 6.8 weight percent tin, 15 weight percent crystalline zeolitic aluminosilicate (zeolite Y) and the remainder amorphous silica-alumina was prepared and sulfided generally by the procedure outlined in Example 1. The catalyst was fluorided by adding a solution of ammonium fluoride during precipitation of the solution and/or sol. The fluoride content was about 2.8 weight percent. The fluorided catalyst was tested for hydrocracking with feed 1 of Table I and found to have an activity index of 30.6.

Hydrocracking catalysts comprising nickel disposed on a porous inorganic oxide support have been found to undergo changes during exposure to hydrocarbon feed under hydrocracking conditions. The changes which occur appear to be related to a crystalline growth phenomena of the hydrogenating nickel component of the catalysts. A growth of nickel crystallites apparently leads to catalyst deactivation and furthermore to difficulty of regeneration. Whereas fluoride is often desired in hydrocracking catalysts comprising nickel because of the additional acidity and selectivity which it imparts to the catalysts, fluoride has the undesirable effect of further increasing nickel crystalline growth which leads to increased deactivation of the catalysts. It has been found that the presence of fluoride in a catalyst comprising nickel and tin, or compounds thereof, associated with a porous inorganic oxide does not contribute to the growth of nickel crystallites to any significant extent. Thus, the addition of tin to a catalyst comprising nickel and having minor amounts of fluoride present is considered to have resolved one of the serious problems with fluorided catalysts.

In addition, catalysts comprising nickel and crystalline zeolitic aluminosilicates without tin show increased nickel crystallite growth during hydrocracking. The crystallite growth occurs regardless of the absence of fluoride. This phenomenon has in the past led to the use of other more stable hydrogenating metal components, such as palladium, in zeolite combinations. The catalysts comprising nickel and tin, or compounds thereof, and crystalline zeolitic aluminosilicates do not show growth of nickel crystallites with hydrocracking use.

EXAMPLE 6

Several catalysts comprising various concentrations of nickel and/or tin associated with a silica-alumina support, and identified in Example 2, were tested for hydrocracking with feed 2 of Table I, under conditions permitting the determination of activity indices. From the measured conversion of the feed to lower boiling products at 570° F. and 540° F., the temperature required for 60 percent conversion was determined; the aniline point at 60 percent conversion was also determined. The results are presented in Table IV.

TABLE IV

| Catalyst | Weight Percent | | 60% Conversion | |
|---|---|---|---|---|
| | Ni | Sn | Temp., ° F. | Aniline Point |
| A | 8.8 | 0 | 578 | 122.2 |
| C | 8.1 | 4.5 | 560 | 128.2 |
| E | 8.2 | 2.15 | 567 | 124.8 |
| N | 0 | 9 | 750+ | 110.5 |

The addition of tin to a catalyst comprising nickel associated with a porous inorganic oxide measurably increases the activity of the catalyst as can be seen from the decrease in the temperature required to obtain 60 percent conversion of the feed to lower boiling products (catalysts C and E) as compared to a catalyst comprising nickel but no tin (catalyst A). Furthermore, the hydrogenation activity of the catalysts comprising nickel and tin are significantly increased over the hydrogenation activity of the catalyst comprising nickel without tin as seen from the increase in aniline points of catalysts C and E over that of catalyst A. An increase in the aniline point is a measure of the increase in the hydrogenation activity of the catalyst.

EXAMPLE 7

Two catalysts were prepared according to the method of Example 1: catalyst Q, identified in Table III, Example 4; and catalyst R, which comprised a crystalline zeolitic alumino-silicate coprecipitated with amorphous silica-alumina and containing 10.3 weight percent nickel but no tin. The zeolite was present in an amount of approximately 30 weight percent. The catalysts were tested for hydrocracking activity by contacting a feed, described as feed 2 in Table I, with the catalysts at a liquid hourly space velocity of 2, a pressure of 1200 p.s.i.g., and a hydrogen flow rate of 12,000 s.c.f./bbl. of feed. The catalyst temperature was varied in order to maintain 60 percent conversion of the feed to lower boiling products. The feed initially contained 12 p.p.m. sulfur. During the hydrocracking operation, sulfur in the form of dimethyldisulfide was added to the feed to raise the sulfur level of the feed to approximately 2000 p.p.m. Thereafter the sulfur was reduced to the initial level (12 p.p.m. sulfur).

The change in the aniline point of the product from the hydrocracking process at 60 percent conversion as a function of the sulfur content in the feed is shown in the figure. The aniline point is a relative measure of the aromaticity of the product, or the hydrogenation activity of the catalyst. From curve 1, it is seen that the catalyst of the present invention, catalyst Q, which catalyst comprises nickel and tin, shows a marked decrease in aniline point which corresponds to a marked increase in the aromaticity of the product when the sulfur level in the feed is changed from 12 p.p.m. (point a) to 2000 p.p.m. (point b). The reversible selectivity of the catalyst is seen by the significant increase in aniline point upon the removal of sulfur from the feed (point c). On the other hand, the catalyst comprising nickel without tin, catalyst R, displayed very limited selectivity with respect to product aromaticity on the addition and removal of sulfur from the feed. Thus, curve 2 shows a very small change in product aromaticity as the sulfur level in the feed is changed from 12 p.p.m. to 2000 p.p.m. and back to 12 p.p.m.

The foregoing examples involved hydrocarbon feeds containing less than 1 p.p.m. organic nitrogen. The present invention is also applicable using feeds containing at least 10 p.p.m. organic nitrogen.

EXAMPLE 8

A catalyst comprising nickel and tin, associated with silica-alumina, prepared and sulfided generally as in Example 1 was employed to hydrocrack a hydrocarbon feed boiling between about 359° F. and 781° F., and containing 13 p.p.m. organic nitrogen. The starting temperature, which gives an indication of the activity of the catalyst, was 668° F. as compared to a starting temperature of 699° F. when using a catalyst comprising nickel without tin associated with silica-alumina (prepared generally as in Example 1) to hydrocrack the same feed under the same conditions. Furthermore, the fouling rate of the nickel-tin catalyst was lower than that of the nickel catalyst.

The following example shows the usefulness of the nickel-tin catalyst in hydrocracking for the production of high quality jet fuels. Jet fuel fractions generally boil in the range from 300° F. to 530° F., and preferably 320° F. to 500° F.

EXAMPLE 9

A nickel-tin supported catalyst comprising a coprecipitated composite of nickel, tin, and silica-alumina was used for hydrocracking a hydrocarbon feed to produce a high quality jet fuel fraction. The catalyst contained about 9.1 weight percent nickel and about 3.9 weight percent tin. For comparison purposes, a nickel supported catalyst comprising a coprecipitated composite of nickel and silica-alumina but without tin was used for hydrocarbon feed. The nickel supported catalyst contained about 9.5 weight percent nickel. The feeds used with both catalysts were straight-run gas oils boiling within a range from about 500° F. to about 1000° F. The feeds were considered equivalent for test purposes. The reaction conditions include a temperature of 680° F., a pressure of 1900 p.s.i.g., and a liquid hourly space velocity of 1.5.

The nickel-tin supported catalyst produced a 320 to 500° F. fraction of improved jet fuel quality as measured by the smoke point. The jet fuel smoke point was 24 mm. as compared to a jet fuel smoke point of 20 mm. for the 320–500° F. jet fuel fraction recovered from the process, using the nickel supported catalyst.

EXAMPLE 10

A catalyst comprising nickel impregnated onto a coprecipitated composite of nickel, tin, and silica-alumina was and tested for hydrocracking of a light cycle oil feed boiling in the range from 409 to 740° F. The coprecipitated composite was prepared generally by the method of Example 1; that is, an acidic aqueous solution of the compounds, stannous chloride, aluminum chloride, and sodium silicate, was precipitated by adding ammonium hydroxide to the solution; the precipitated slurry was then washed, dried and calcined. The nickel was impregnated onto the coprecipitated composite from a nickel nitrate solution. The catalyst, comprising about 8 weight percent nickel and about 4.5 weight percent tin, was calcined at 1000° F. and at 1300° F. The hydrocracking process was conducted at a temperature of 540° F., an LHSV of 2 and a pressure of 1200 p.s.i.g. The catalyst was found to have higher hydrogenation activity and hydrocracking activity than a catalyst comprising a coprecipitated composite of nickel and silica-alumina but without tin. Furthermore, the catalyst comprising nickel impregnated onto a coprecipitated composite of tin and silica-alumina was superior in hydrocracking activity to a catalyst comprising both nickel and tin impregnated onto silica-alumina. However, a catalyst comprising a coprecipitated composite of nickel and tin and silica-alumina displayed higher hydrocracking activity than a catalyst comprising nickel impregnated onto a coprecipitated composite of tin and silica-alumina.

It has been observed that, in general, nickel-tin supported catalysts comprising a coprecipitated composite of tin and the porous solid carrier, with the nickel present either by coprecipitation or by impregnation, etc., are superior for hydrocracking reactions to nickel-tin supported catalysts, where, if there is a coprecipitated composite, tin is not part of the coprecipitate. While not intending to limit the scope of the present invention or be bound by any theoretical explanation, it appears that the presence of tin in the coprecipitated composite facilitates the formation of an alloy with the nickel during subsequent high temperature treatment, and that this alloy is at least in part responsible for the superior hydrocracking activity. The alloy is believed to be $Ni_3Sn$. Apparently the alloy forms more readily when both nickel and tin are part of the coprecipitated composite, for catalysts comprising coprecipitated composites of nickel and tin and the porous inorganic oxide are more active for hydrocracking than catalysts comprising nickel impregnated onto a coprecipitated composite of tin and the porous inorganic oxide.

The following example illustrates the advantage of the catalyst of the present invention for the conversion of aromatic hydrocarbons into more saturated hydrocarbons.

EXAMPLE 11

Two catalysts were prepared generally according to the method of Example 1 and are identified as catalysts A and C in Table II, Example 2. Catalyst A, comprising a coprecipitated composite of nickel and silica-alumina, and catalyst C, comprising a coprecipitated composite of nickel, tin, and silica-alumina, were tested for the hydrogenation of a sulfur-free benzene feed at a temperature of 725° F., a pressure of 1200 p.s.i.a., a liquid hourly space velocity of 3, and a hydrogen to benzene ratio of 10. The catalyst comprising nickel and tin (catalyst C) was far superior in the hydrogenation of benzene than the catalyst comprising nickel without tin (catalyst A). For example, after approximately 20 hours of operation, the process using catalyst C resulted in 98.4 mole percent benzene converted to methylcyclopentane and cyclohexane with only 1.4 mole percent benzene converted to cracked products. On the other hand, the process using catalyst A resulted in only 83.7 mole percent benzene converted to methylcyclopentane and cyclohexane but with 16.2 mole percent benzene converted to cracked products. Thus, the catalyst of the present invention when used for benzene hydrogenation displays high hydrogenation activity and low cracking activity as compared to a catalyst comprising a coprecipitated composite of nickel and silica-alumina but without tin.

Catalysts A and C were also tested for the hydrogenation of a benzene feed containing about 20 p.p.m. sulfur under the same reaction conditions as were used in the tests with the sulfur-free benzene feed. The catalyst comprising nickel and tin (catalyst C) produced a higher concentration of converted products (methylcyclopentane and cyclohexane) over a significantly longer period of time than the catalyst comprising nickel but containing no tin (catalyst A). The sulfur markedly decreased the benzene hydrogenation activity of catalyst A after only about 5 hours onstream time. The benzene hydrogenation activity of catalyst C decreased as a result of the presence of sulfur only after 15 to 20 hours onstream time.

EXAMPLE 12

A nickel-tin containing catalyst was compared with a nickel catalyst without tin for reversible sulfur sensitivity in respect to product aromaticity during hydrocracking.

The nickel-tin catalyst comprised 9.0 weight percent nickel and 3.6 weight percent tin in association with a porous silica-alumina support. The catalyst was prepared by coprecipitating an acidic aqueous solution containing nickel chloride, tin chloride, aluminum chloride, and sodium silicate with a base, aluminum hydroxide. The preparation procedure was similar to the procedure described more fully in Example 1. The resulting slurry was washed, dried and calcined. The coprecipitated composite of nickel and tin oxides was sulfided by insertion into a reactor where it was heated at 559° F. to a pressure of about 900 p.s.i.g., with flowing hydrogen for a period of 3 hours. A mixture of dimethyldisulfide and mixed hexanes was introduced into the flowing hydrogen. Injection of the hydrogen was continued for about 36 minutes at a temperature of 559° F. and then discontinued. The nickel catalyst was prepared generally by the procedure of Example 1 by coprecipitating an acidic aqueous solution containing nickel chloride, aluminum chloride, and sodium silicate, with ammonium hydroxide. The resulting slurry was washed, dried, and calcined and subsequently sulfided by a procedure similar to that used with the nickel-tin catalyst of this example. The nickel-containing catalyst contained 9.3 weight percent nickel in association with the silica-alumina carrier.

The feed was a California light cycle oil boiling within the range from 396 to 744° F., and containing 21.4 volume percent aromatics, 67.6 volume percent naphthenes, and 11 volume percent paraffins.

The catalysts were tested in the presence of hydrogen and under hydrocracking conditions including a liquid hourly space velocity of 2, a hydrogen flow rate of 1500 s.c.f./bbl., and a pressure of 900 p.s.i.g. The average catalyst temperature was increased in order to maintain 80 percent conversion of the feed to products boiling below about 400° F. Sulfur as dimethyl-disulfide was added to the feed. The process was conducted on a once-through basis so that no sulfur entered the reaction zone by a recycle stream.

The aromatic content of the product was measured as alkylbenzenes boiling within the range of $C_6$ to $C_{12}$. The sulfur content in the reaction zone was varied to show whether there was reversible selectivity with respect to sulfur. The results are shown in Table V.

TABLE V

| Catalyst | Sulfur in Reaction Zone, p.p.m. | Alkylbenzene Concentration in Product, Vol. Percent |
| --- | --- | --- |
| Ni | 60 | 15.1 |
|  | 240 | 15.3 |
|  | 300 | 15.3 |
|  | 600 | 15.3 |
| Ni-Sn | 0 | 12.1 |
|  | 240 | 12.8 |
|  | 600 | 13.9 |
|  | 1,200 | 14.7 |
|  | 0 | 12.5 |

It is evident that the catalyst comprising nickel and tin was reversibly sensitive to the presence of sulfur in the feed, i.e., as the sulfur varied from 0 to 1200 p.p.m., the alkylbenzene concentration varied from 12.1 volume percent to 14.7 volume percent. When the sulfur concentration dropped to 0, the alkylbenzene concentration dropped to 12.5 or nearly to the initial concentration of alkylbenzene before sulfur was introduced into the feed. On the other hand, the nickel catalyst without tin displayed substantially no change in product aromaticity as the sulfur was changed from 60 to 600.

Measuring the total aromatics (alkylbenzenes plus any other forms of aromatics) in the products for the hydrocracking run with the nickel-tin catalyst showed that the total aromatics varied from about 16.4 volume percent aromatics for 0 p.p.m. sulfur in the reaction zone to 21.5 volume percent aromatics when 1200 p.p.m. sulfur was present. When sulfur was removed the aromatic content of the product decreased to nearly the same value as that obtained before sulfur was first introduced. Thus, at the high levels of sulfur in the reaction zone, a gasoline fraction was produced, i.e., a fraction containing more than 20 volume percent aromatics. As the sulfur content in the reaction zone was decreased, a jet fuel fraction was produced. It is evident that the process of the present invention can be utilized to vary the production of jet fuel and gasoline depending on the market conditions.

The reversible sensitivity of the nickel-tin catalyst will be even more evident at lower overall conversion levels and at higher pressures than used in this example; i.e., at a conversion level of 50 volume percent rather than 80 volume percent and at 1300 p.s.i.g. rather than 900 p.s.i.g.

EXAMPLE 13

A catalyst comprising nickel and tin associated with fluorided alumina was tested in a hydrocracking process for reversible selectivity with respect to product aromaticity by addition of sulfur to the feed. The catalyst was prepared generally by the method of Example 1 by adding an ammonium hydroxide solution to a solution containing aluminum chloride, nickel chloride, stannous chloride and acetic acid. The ammonium hydroxide was added until the pH was about 7.5. Thereafter the resulting slurry was hot aged at about 200° F., filtered and washed with an ammonium acetate solution. The catalyst was dried, calcined for 2 hours at 400° F., for 2 hours at 800° F. and for 3 hours at 1000° F. in air. A portion of the resulting dried catalyst (3 cc.) was contacted with 0.2 cc. of fluorobenzene in a jet fuel stream at 738° F. The catalyst comprised about 20 weight percent nickel and 7.5 weight percent tin. The catalyst was not sulfided prior to use in the hydrocracking test.

The fluorided catalyst was tested at hydrocracking conditions including a pressure of 1300 p.s.i.g., a liquid hourly space velocity of 2 and a temperature sufficient to maintain 83 percent conversion to product boiling below 400° F. The feed used was the same as that described in Example 12.

Sulfur, as dimethyldisulfide, was added to the hydrocracking feed during part of the operation. The alkylbenzenes were measured as a function of the sulfur level in the reaction zone. Results are shown in Table VI.

TABLE VI

| Sulfur level, p.p.m.: | Alkylbenzenes, vol. percent |
| --- | --- |
| 0 | 8.3 |
| 600 | 11.3 |
| 0 | 9 |

It is evident that catalyst containing nickel and tin in association with a fluorided alumina displays significant reversible sensitivity in respect to product aromaticity when the sulfur level in the reaction zone is varied.

The foregoing disclosure of this invention is not considered to be limiting since variations can be made by those skilled in the art without departing from the scope and spirit of the appended claims.

I claim:
1. In a hydrocracking process wherein a hydrocarbon feed boiling above the gasoline range and containing aromatic hydrocarbons is contacted with a catalyst comprising nickel, or compounds thereof, and tin, or compounds thereof, associated with a porous inorganic oxide carrier, said nickel, or compounds thereof, and tin, or compounds thereof, being present in an amount of from 2 to 50 combined weight percent metals, with a nickel to tin weight ratio of from 0.25 to 20, in the presence of hydrogen at hydrocracking conditions, including a temperature between about 400 to 750° F., selected to give a substantial conversion to at least one desired product selected from the class consisting of gasoline and jet fuel; the improved method for controlling and alternately varying the aromaticity of said desired product which comprises: maintaining (A) a relatively high continuous concentration of sulfur above about 10 p.p.m. sulfur to feed in the hydrocracking zone, to produce a relatively aromatic product and (B) a relatively low continuous concentration of sulfur below about 4000 p.p.m. sulfur to feed in the hydrocracking zone to produce a relatively nonaromatic product.

2. The process of claim 1 wherein the relatively low continuous concentration of sulfur to maintain a relatively nonaromatic product is below about 2000 p.p.m.

3. The process of claim 1 wherein the relatively low continuous concentration of sulfur to maintain a relatively nonaromatic product is below about 200 p.p.m.

4. The process of claim 1 wherein the porous inorganic oxide is silica-alumina.

5. The process of claim 1 wherein said hydrocarbon feed contains at least 10 volume percent aromatics.

6. The process of claim 1 wherein said hydrocracking catalyst comprises a crystalline zeolitic aluminosilicate.

7. The process of claim 1 wherein said hydrocracking catalyst comprises a coprecipitated composite of said nickel and tin, or their compounds, and said porous inorganic oxide.

8. In a hydrocracking process wherein a hydrocarbon feed containing at least 10 volume percent aromatics is contacted with a catalyst comprising nickel and tin, or their compounds, associated with a porous siliceous inorganic oxide, the total nickel and tin combined weight percent being from 2 to 50, the nickel to tin weight ratio being from 0.25 to 20, in a hydrocracking zone at reaction conditions, including a temperature between about 400 to 750° F., and a pressure of from 500 p.s.i.g. to 2500 p.s.i.g. and in the presence of hydrogen to produce at least one product selected from the group consisting of gasoline and jet fuel, the improvement for controlling and alternately varying the production of a relatively aromatic gasoline fraction and a relatively nonaromatic jet fuel fraction which comprises maintaining in said hydrocracking zone a concentration of sulfur which is (A) relatively low, less than about 2000 p.p.m. sulfur to feed when the desired product to be recovered therefrom is mainly jet fuel, and (B) relatively high, greater than about 10 p.p.m. sulfur to feed when the desired product to be recovered is mainly gasoline.

References Cited

UNITED STATES PATENTS

| | | | |
|---|---|---|---|
| 3,073,777 | 1/1963 | Oettinger | 208—111 |
| 3,132,090 | 5/1964 | Helfrey et al. | 208—111 |

DELBERT E. GANTZ, Primary Examiner

A. RIMENS, Assistant Examiner

U.S. Cl. X.R.

252—455